United States Patent
Ziad et al.

(10) Patent No.: US 9,143,350 B2
(45) Date of Patent: Sep. 22, 2015

(54) HUMAN/MACHINE INTERFACE FOR AUTOMOBILE

(75) Inventors: El Khoury Ziad, Antony (FR); Frederic Autran, Paris (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 13/255,251

(22) PCT Filed: Mar. 12, 2010

(86) PCT No.: PCT/FR2010/000211
§ 371 (c)(1),
(2), (4) Date: Jan. 13, 2012

(87) PCT Pub. No.: WO2010/103208
PCT Pub. Date: Sep. 16, 2010

(65) Prior Publication Data
US 2012/0109452 A1    May 3, 2012

(30) Foreign Application Priority Data

Mar. 12, 2009  (FR) ...................................... 09 51572

(51) Int. Cl.
G06F 17/00 (2006.01)
B23P 11/00 (2006.01)
H04L 12/413 (2006.01)
B60K 35/00 (2006.01)
H04L 12/40 (2006.01)

(52) U.S. Cl.
CPC .............. *H04L 12/413* (2013.01); *B60K 35/00* (2013.01); *B60K 2350/1024* (2013.01); *H04L 2012/40215* (2013.01); *H04L 2012/40273* (2013.01); *Y10T 29/49002* (2013.01)

(58) Field of Classification Search
CPC ................... H04L 12/413; H04L 2012/40215; H04L 2012/40273; B60K 35/00; B60K 2350/1024; Y10T 29/49002
USPC ........................................................... 701/36
See application file for complete search history.

(56) References Cited

U.S. PATENT DOCUMENTS

| | | | |
|---|---|---|---|
| 4,083,620 A * | 4/1978 | Burgin | 439/298 |
| 5,402,151 A * | 3/1995 | Duwaer | 345/173 |
| 6,175,789 B1 | 1/2001 | Beckert et al. | |
| 6,202,008 B1 | 3/2001 | Beckert et al. | |
| 2002/0111715 A1 * | 8/2002 | Richard | 701/1 |
| 2007/0262422 A1 * | 11/2007 | Bakalski et al. | 257/659 |

OTHER PUBLICATIONS

International Search Report w/translation from PCT/FR2010/000211 dated Jun. 21, 2010 (4 pages).

* cited by examiner

*Primary Examiner* — Mary Cheung
*Assistant Examiner* — Anne Mazzara
(74) *Attorney, Agent, or Firm* — Osha Liang LLP

(57) ABSTRACT

The invention relates to a human/machine interface (3) that includes a control board (30) provided with at least one control (31, 32, 33) and/or at least one indicator and with at least one controller (36) for managing the operation of the control board (30) and the communications thereof with a vehicle multiplex network via at least one associated connector (37), characterized in that said interface also includes a multifunction screen (41) connected to the controller (36) of the control board so that said controller (36) can also manage the operation of the multifunction screen (41) and the communications thereof with the vehicle multiplex network via said associated connector (37).

12 Claims, 2 Drawing Sheets

HUMAN/MACHINE INTERFACE FOR AUTOMOBILE

TECHNICAL FIELD OF THE INVENTION

The present invention relates to a human/machine interface for an automobile.

It is known practice to provide automobiles, in a central area of their dashboard, with human/machine interfaces allowing for the control of equipment, such as air conditioning and/or a radio, or obtaining information displayed on a multifunction screen concerning, for example, a multimedia player or satellite positioning assistance.

Figures 1, 2:
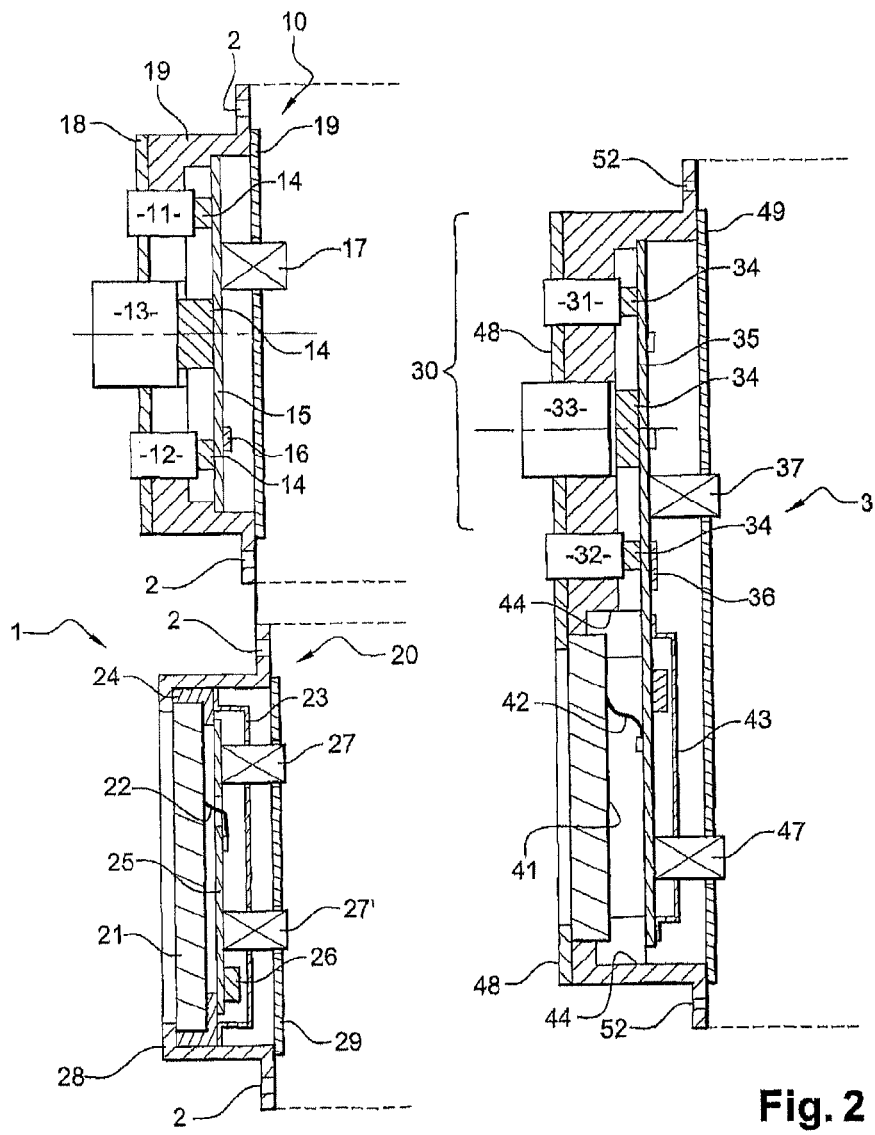

Referring to FIG. 1, this shows a first interface 10 of a control board and a second interface 20 of a multifunction screen of one and the same dashboard 1, that are known. More specifically:

the interface 10 comprises buttons 11 and 12 and a thumbwheel 13 enabling the user of the vehicle to transmit commands to an electronic board 15 via mechanical interfaces 14.

This electronic board 15 includes a processor 16, hereinafter called controller 16, which manages the operation of the interface 10, that is to say, all the operations necessary for maintaining the activity of this interface 10, in particular its connections with the equipment situated outside the interface via a connector 17 that allows, for example, for the transmission of signals via a multiplexed network of the vehicle of CAN or LIN type.

This interface 10 has a covering surface 18, or shield plate, whose function is to insulate the interior of the interface from the passenger compartment for esthetic and technical reasons—protection from dust and any splashes.

Finally, a cover 19 is used to incorporate all the elements of the interface in a single block that can be incorporated in the dashboard by simple insertion followed by fixing by means of tabs 2.

The interface 20 of the multifunction screen comprises a screen 21 with touch control, such that a displayed function can be activated/deactivated by contact with an area of the screen dedicated to that function.

This touch screen 21 is linked to an electronic board 25 via a signal transmitter 22 linked, on the one hand, to the screen 21 and, on the other hand to a component using the information supplied by the sensor of the touch screen 21 to generate control signals.

The electronic board also includes a controller 26 which manages the operation of the multimedia interface, that is to say, all the operations necessary for maintaining the activity of this interface 20, in particular its connections with the outside of the interface allowing for the transmission of signals via a connector 27, transmitted by the multiplexed network of the vehicle.

By way of example, such a connector thus makes it possible to transmit the signals relating to the activation/deactivation of the screen, to the interface diagnostic function, to the interface lighting level, or to the requisite commands by touch.

The video signals displayed by the screen 21 are transmitted via a dedicated connector 27' transmitting these video signals according to the video coding protocol.

Video components of the board 25 perform a processing operation on these signals, for example the decompression and/or decoding of the video signals, with a high frequency, of around several MHz, in accordance with the known image processing protocols. Because of this, the multimedia interface 10 requires a shielding 23, to magnetically insulate these video components of the board 25 from the other equipment of the vehicle. Also, supports 24 made of metal—typically of aluminum—are provided to allow for a satisfactory thermal dissipation of the energy radiated by the board and by the screen.

Furthermore, it should be noted that this multimedia interface has a covering surface 28, or protective shield, whose function is to insulate the interior of the interface from the passenger compartment for esthetic and technical reasons—protection from dust and possible splashes.

Finally, a cover 29 is used to incorporate all the elements of the interface in a single block in the dashboard by simple insertion followed by fixing by means of tabs 2.

The present invention takes on board the observation that such a plurality of interfaces has numerous drawbacks. For example, it requires industrial design, testing, implementation and organization operations specific to each of these interfaces.

Furthermore, this plurality of equipment requires a significant volume, whereas the video interface has a limited space for the cooling of its video card and for the incorporation of the electromagnetic shielding elements.

Furthermore, the edges and the joins between the interfaces and the control board are sources of vibrations and they create a greater impression of unsatisfactory quality when the interfaces come from different manufacturers and do not provide an overall esthetic.

The present invention aims to resolve at least one of the abovementioned drawbacks. This is why it relates to a human/machine interface comprising a control board, provided with at least one control and/or at least one indicator, and a controller managing the operation of the control board and its communications, via at least one associated connector, with a multiplexed network of the vehicle, characterized in that it also comprises a multifunction screen linked to the controller of the control board so that this controller can also manage the operation of the multifunction screen and its communications, via the associated connector, with the multiplexed network of the vehicle.

Such an interface offers numerous advantages: it makes it possible to assemble, in one and the same block, a multifunction screen and a control board, which facilitates and simplifies the mounting thereof in a single operation. The mounting quality, in its production in the factory and in its perception by the user of the vehicle, is thus enhanced.

Furthermore, the interface has a protection surface that is more uniform and, by corollary, that has fewer joins with the dashboard. Because of this, such an interface is more resistant to external attacks—dust, splashes—while offering a uniform esthetic overall.

It should be noted that the operation managed by the controller relates to the operations necessary for maintaining the activity of the interface 10, such as the power supply, and not the control of equipment situated outside the interface.

In one embodiment, the controller includes means for processing signals transmitted by the associated connector at a frequency significantly lower than the frequency of video signals received by the multifunction screen via a video connector.

Typically, the controller processes multiplexed signals of an internal network, of CAN (controller area network) type, or of LIN (local interconnect network) type, with a frequency of the order of tens of KHz, whereas the video signals are processed with a frequency of the order of several MHz.

According to one embodiment, the screen is provided with a touch-sensitive surface linked to the controller.

In one embodiment, the screen is associated with a shielding whose function is to limit the electromagnetic radiation emitted by the screen and/or by video components dedicated to processing the video signal.

According to one embodiment, the video components dedicated to processing the video signal are linked to a video signal transmission network via a video connector.

In one embodiment, the video connector includes means for transmitting a video stream from a multimedia player and/or from a satellite navigator to the screen and/or from any other image or video-stream generating equipment.

According to one embodiment, the controller and the video components are situated on at least one electronic card whose main surface is substantially parallel to the surface of the interface intended to be facing the passenger compartment.

In one embodiment, the controller is situated on a first card and the video components are situated on a second card, the first and second cards being linked by flexible connections allowing for the transmission of operating signals from the controller to the second card.

According to one embodiment, the controller includes means for managing the operation of the control board and of the screen by performing at least one of the following operations necessary to the interface activity: acquiring a command and/or driving an indicator, switching the screen on/off, processing information relating to a diagnosis, controlling a display light intensity.

In one embodiment, the interface has a protection surface and a cover extending practically over the length of the interface.

The invention also relates to a method for assembling a human/machine interface comprising a control board, provided with at least one control and/or at least one indicator, and a controller managing the operation of the control board and its communications, via at least one associated connector, with a multiplexed network of the vehicle, characterized in that, the interface comprising a multifunction screen linked to the controller of the control board in accordance with one of the preceding claims, the interface is inserted into the dashboard in a single block.

Figure 3:
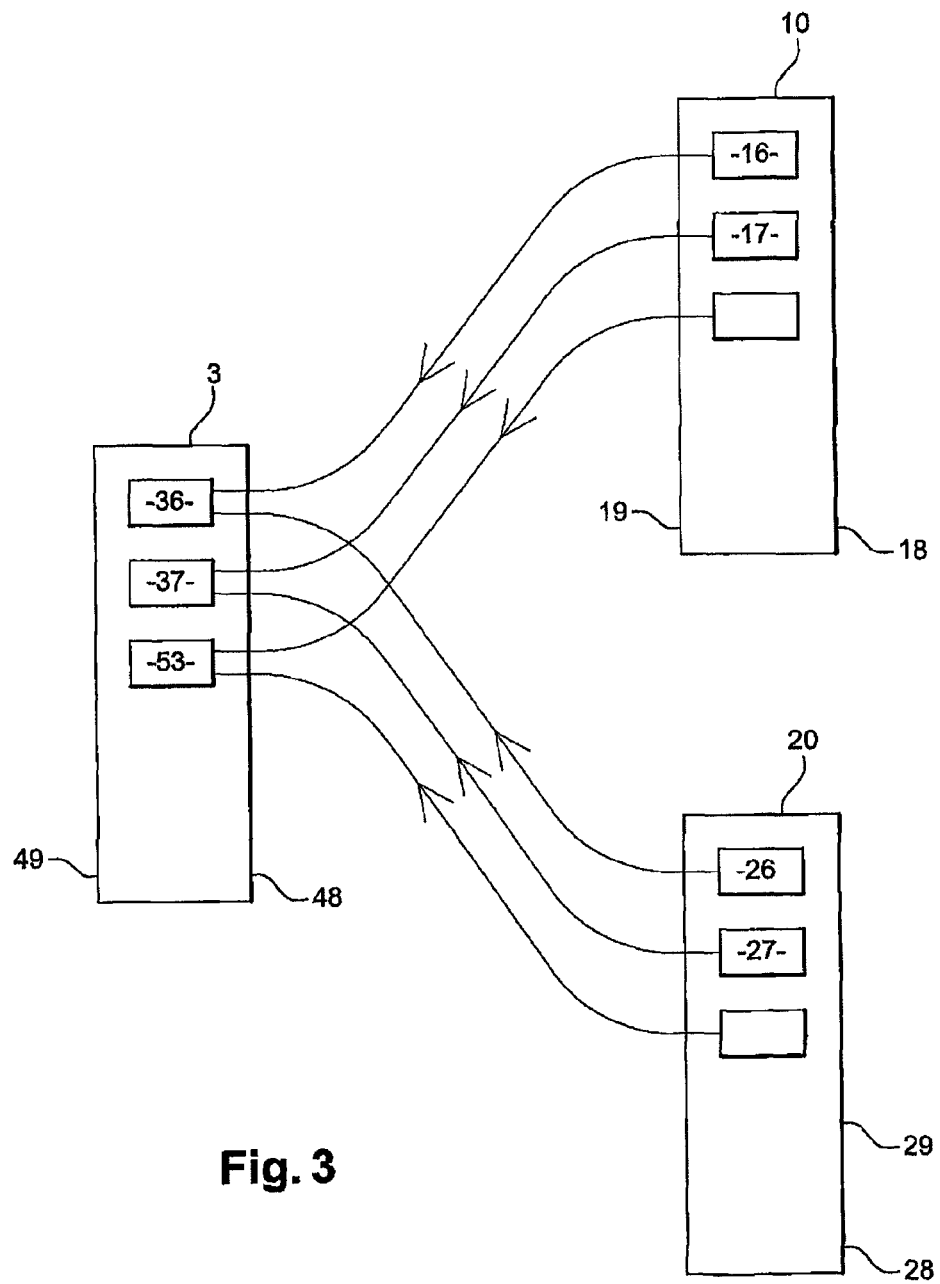

Other features and advantages of the invention will become apparent from the description given hereinbelow, as a non-limiting indication, with reference to the various appended figures which show:

in FIG. 1, already described, cross-sectional views of the interface of a dashboard and of the interface of a control board according to the prior art, in FIG. 2, a cross-sectional view of an interface of a dashboard associated with a multifunction screen according to the invention, and in FIG. 3, a functional representation of the pooling of different components between a control board and a screen in an interface according to the invention.

DESCRIPTION THE PREFERRED EMBODIMENTS OF THE INVENTION

The elements that appear in different figures retain, unless specifically stated, the same references.

Referring to FIG. 2, this shows an interface 3 comprising a control board 30 provided with buttons 31 and 32 and a thumbwheel 33 enabling the user of the vehicle to transmit commands to an electronic card 35 via mechanical interfaces 34.

This electronic card 35 includes a processor 36, hereinafter called controller 36, which manages the operation of the interface 3, in particular its connections with the outside of the interface via a connector 37 linked to a multiplexed network of the vehicle of CAN or LIN type.

According to the invention, this interface 3 also comprises a multifunction screen 41 linked to the controller 36 of the control board so that this controller 36 can also manage the operation of the multifunction screen 41 and its communications, via the connector 37 associated with the controller 36, with the CAN or LIN multiplexed network of the vehicle.

In this embodiment, the screen 41 has touch control so that a function displayed on this screen 41 can be activated or deactivated by contact with an area of this screen 41.

To this end, the touch screen 41 is linked to the electronic card 35 via a signal transmitter 42 linked, on the one hand, to the screen 41 and, on the other hand, to a component dedicated to detecting deformations of the screen to generate control signals.

According to the invention, the controller 36 manages the operation of the interface 3 by controlling the operations necessary for maintaining the operation of this interface such as connections of the latter with the multiplexed network of the vehicle, of CAN or LIN type, via the connector 37.

As an example, such a connector 37 thus makes it possible to transmit the signals concerning the activation/deactivation of the screen, the interface diagnostic procedure, its lighting level, or the requisite commands by touch.

The video signals displayed are transmitted via a dedicated connector 47, these video signals being transmitted according to a protocol specifically for the digital coding implemented for their transmission and/or display.

Typically, these video signals come from a multimedia player and/or a satellite navigator linked to the screen by a dedicated video connector 47.

When processing these signals, the card 35 processes the transmitted signals with a high frequency, of the order of several MHz, in accordance with the known image-processing protocols.

In other words, the controller 36 manages only the operations necessary to the operation of the multifunction screen 41 and of the control board 30, the processing of the video signals being handled by dedicated components.

Furthermore, the interface 3 has a partial shielding 43 blocking the electromagnetic radiation of the components processing the video signals at high frequency, typically several hundreds of MHz.

Similarly, the screen 41 is shielded in order to limit its electromagnetic radiation.

To recap, the signals transmitted via the connector 37, specific to the multiplexed network of the vehicle, are transmitted with frequencies of the order of a KHz.

Supports 44 made of metal—typically of aluminum—are provided to allow for a satisfactory thermal dissipation of the energy radiated by the card and by the screen. However, in this embodiment the use of one and the same card 35 makes it possible to dissipate the heat generated by the video part of the interface over a surface area that is particularly large since this card 35 extends, substantially parallel to the surface of the interface, practically over the length of the interface.

In other embodiments, the interface 3 has a curved shape and the card 35 is replaced by a plurality of cards, the controller 36 being situated on a first card and the video components being situated on a second card linked to the first card by flexible connections allowing the operation of the screen to be controlled by the controller 36.

Such an embodiment makes it possible to use a significant part of an interface—in particular the video part—by modifying only the controller if necessary.

Independently of the number of cards implemented, the human/machine interface according to the invention can have a small thickness, of the order of 30 mm, which is particularly advantageous in the assembly of automobiles.

This thickness is measured between its covering surface 48, or shield plate, whose function is to insulate the interior of the interface from the passenger compartment for esthetic and technical reasons—protection from dust and possible splashes, and its cover 49 incorporating all the elements of the interface in a single block.

As represented in FIG. 2, the shield plate 48 and the cover 49 extend over all the surface of the interface intended to be facing, respectively, the passenger compartment or engine compartment of the vehicle.

By virtue of this shield plate 48 and the cover 49, the interface can be incorporated, in one block, in the dashboard by simple insertion followed by fixing by means of tabs 52, the number of tabs thus being reduced compared to the prior art.

The invention also makes it possible to reduce the number of components required for the operation of the interface. As a matter of fact, as shown in FIG. 3, functions of the control board interface 10 and of the multifunction screen interface 20 are pooled, in the interface 3 according to the invention, which reduces the number of components embedded in the vehicle.

For example: one controller 36 replaces the two controllers 16 and 26, one connector 37 replaces the two connectors 17 and 27, a single power supply 53 is required for the two power supplies—not referenced—of the control board or of the screen.

Moreover, the use of a single protection surface 48, replacing the two protection surfaces 18 and 28, makes it possible to improve the quality and reliability of the mounting as previously indicated.

Other elements, not represented, can be pooled. For example, the shielding required for the screen and/or the high frequency video components can be used to limit the electromagnetic radiation of another element of the interface.

The present invention lends itself to many variants. For example, the controller 36 of the interface can be developed to directly manage functions requiring a low computation capability, such as air conditioning.

According to the embodiments, the screen 41 of the interface may be of a different nature—OLED, TFT for example—and fixed rigidly or moveably, for example pivoting, to the interface. Similarly, according to variants, this screen uses or does not use touch control.

Also, according to other variants, the interface may include an LED-type indicator or liquid crystal display.

In conclusion, it can been seen that a human/machine interface according to the invention offers numerous advantages, such as its small thickness, which derive from the pooling of different elements—like the processor—to manage the operation of a control board and of a multifunction screen.

Furthermore, these advantages can be increased by the possible use, for an element of the interface, of a significant space parallel to all the surface of the interface situated facing the passenger compartment of the vehicle.

Thus, an electronic card of large dimensions can be situated parallel to this surface of the interface, which makes it possible to reduce the thickness of the interface by comparison to an interface dedicated to a single function—dashboard or multifunction screen for example.

The invention claimed is:

1. A human/machine interface for a motor vehicle comprising:
    a control board provided with at least one control and at least one indicator; and
    a controller for managing operation and communications of the control board, via at least one associated connector, with a multiplexed network of the motor vehicle; and
    a multifunction screen linked to the controller of the control board, wherein the controller manages operation and communications of the multifunction screen, via the associated connector, with the multiplexed network of the motor vehicle,
    wherein the multifunction screen, the controller, and the control board are all integrated into the human/machine interface,
    and wherein an internal cover and a protection surface or shield plate of the human/machine interface extend over all of a surface of the interface configured to face an engine compartment of the motor vehicle, wherein by virtue of the internal cover and the protection surface, all elements of the human/machine interface are incorporated into a single block for installation into the dashboard of the motor vehicle.

2. The human/machine interface as claimed in claim 1, wherein the multifunction screen is provided with a touch-sensitive surface linked to the controller.

3. The human/machine interface as claimed in claim 2, wherein the controller includes means for processing multiplexed signals, transmitted via the associated connector, at a frequency significantly lower than a processing frequency for video signals received by the multifunction screen.

4. The human/machine interface as claimed in claim 3, wherein the multifunction screen is associated with a shielding for limiting an electromagnetic radiation emitted by the multifunction screen and/or by video components dedicated to processing video signals.

5. The human/machine interface as claimed in claim 4, wherein the video components dedicated to processing video signals are linked to a video signal transmission network via a video connector.

6. The human/machine interface as claimed in claim 5, wherein the video connector includes means for transmitting a video stream from a multimedia player and/or from a satellite navigator to the multifunction screen.

7. The human/machine interface as claimed in claim 4, wherein the controller and the video components are situated on one electronic card comprising a main surface that is substantially parallel to the touch-sensitive surface of the interface intended to be facing a passenger compartment of the motor vehicle.

8. The human/machine interface as claimed in claim 7, wherein the controller is situated on a first card and the video components are situated on a second card, the first and second cards being linked by flexible connections allowing for transmission of operating signals from the controller to the second card.

9. The human/machine interface as claimed in claim 1, wherein the controller includes means for managing the operation of the control board and of the multifunction screen by performing at least one of the following operations necessary to interface activity: acquiring a command and/or driving an indicator, switching the multifunction screen on/off, processing information relating to a diagnosis, and controlling a display light intensity.

10. The human/machine interface as claimed in claim 1, further comprising a protection surface and a cover extending over all of a surface of the interface configured to face a passenger compartment of the motor vehicle.

11. The human/machine interface as claimed in claim 1, further comprising tabs for fixing the interface on a dashboard.

12. A method for assembling a human/machine interface for a motor vehicle, comprising:
inserting the human/machine interface into a dashboard of the motor vehicle in a single block, wherein the human/machine interface comprises:
a control board provided with at least one control and at least one indicator,
a controller for managing operation and communications of the control board, via at least one associated connector, with a multiplexed network of the motor vehicle,
a multifunction screen linked to the controller of the control board,
wherein the multifunction screen, the controller, and the control board are all integrated into the human/machine interface,
and wherein an internal cover and a protection surface or shield plate of the human/machine interface extend over all of a surface of the interface configured to face an engine compartment of the motor vehicle, wherein by virtue of the internal cover and the protection surface, all elements of the human/machine interface are incorporated into a single block for insertion into the dashboard of the motor vehicle.

* * * * *